(12) United States Patent
Kim et al.

(10) Patent No.: US 11,752,866 B2
(45) Date of Patent: Sep. 12, 2023

(54) ORGAN-TYPE ELECTRONIC PEDAL DEVICE

(71) Applicants: Hyundai Motor Company, Seoul (KR); Kia Corporation, Seoul (KR); Kyung Chang Industrial Co.,Ltd., Daegu (KR)

(72) Inventors: Eun Sik Kim, Gwangmyeong-si (KR); Hyeon Uk Kim, Daegu (KR); Ji Soo Kim, Daegu (KR); Jong Hwan Han, Daegu (KR)

(73) Assignees: HYUNDAI MOTOR COMPANY, Seoul (KR); KIA CORPORATION, Seoul (KR); KYUNG CHANG INDUSTRIAL CO., LTD., Daegu (KR)

(*) Notice: Subject to any disclaimer, the term of this patent is extended or adjusted under 35 U.S.C. 154(b) by 0 days.

(21) Appl. No.: 17/840,781

(22) Filed: Jun. 15, 2022

(65) Prior Publication Data
US 2023/0059359 A1    Feb. 23, 2023

(30) Foreign Application Priority Data
Aug. 18, 2021  (KR) .................. 10-2021-0108986

(51) Int. Cl.
*B60K 26/02* (2006.01)
*B60T 7/04* (2006.01)

(52) U.S. Cl.
CPC ............ *B60K 26/021* (2013.01); *B60T 7/042* (2013.01)

(58) Field of Classification Search
CPC ... B60K 26/021; B60T 7/042; B60T 2220/04; G05G 1/30; G05G 1/38; G05G 1/44; G05G 5/03
See application file for complete search history.

(56) References Cited

U.S. PATENT DOCUMENTS

| | | | |
|---|---|---|---|
| 6,523,433 B1 | 2/2003 | Staker | |
| 7,793,566 B2 | 9/2010 | Ypma | |
| 8,240,230 B2 * | 8/2012 | Peniston | G05G 1/38 |
| | | | 324/207.13 |
| 2007/0137400 A1 * | 6/2007 | Campbell | G05G 5/03 |
| | | | 74/513 |

FOREIGN PATENT DOCUMENTS

| | | | | |
|---|---|---|---|---|
| CN | 202827159 U | * | 3/2013 | |
| DE | 102006035882 A1 | * | 2/2008 | ............ B60K 26/02 |
| DE | 102014103167 A1 | * | 9/2015 | ............ B60K 26/02 |
| KR | 10-0930662 B1 | | 12/2009 | |

(Continued)

OTHER PUBLICATIONS

Machine translation of DE 102006035882 obtained from fit database, 2008 (Year: 2008).*

(Continued)

*Primary Examiner* — Thomas C Diaz
(74) *Attorney, Agent, or Firm* — Morgan, Lewis & Bockius LLP

(57) ABSTRACT

An organ-type electronic pedal device includes a high-load spring module and a hysteresis lever. If necessary, the organ-type pedal device enables different pedal efforts, strokes, and hysteresis operating forces to be tuned as required for individual vehicle models by changing the parts of the hysteresis lever.

14 Claims, 7 Drawing Sheets

(56) References Cited

FOREIGN PATENT DOCUMENTS

| KR | 10-1659342 B1 | 9/2016 |
|---|---|---|
| KR | 10-1661724 B1 | 10/2016 |
| KR | 10-1691035 B1 | 12/2016 |
| KR | 10-2035050 B1 | 10/2019 |
| KR | 10-2020-0070946 A | 6/2020 |
| WO | 2007/116293 A1 | 10/2007 |

OTHER PUBLICATIONS

Machine translation of CN 202827159 obtained from fit database, 2013 (Year: 2013).*
Machine translation of DE 102014103167 obtained from fit database, 2015 (Year: 2015).*

* cited by examiner

ORGAN-TYPE ELECTRONIC PEDAL DEVICE

CROSS-REFERENCE TO THE RELATED APPLICATION

The present application claims the benefit of priority to Korean Patent Application No. 10-2021-0108986, filed on Aug. 18, 2021 in the Korean Intellectual Property Office, the disclosure of which is incorporated herein by reference in its entirety.

BACKGROUND

1. Technical Field

The present disclosure relates to an organ-type electronic pedal device, and more particularly, to an organ-type electronic brake pedal device that enables a pedal effort, a stroke, and a hysteresis operating force to be tuned as required by a driver by changing parts of a hysteresis lever.

2. Description of the Related Art

In general, examples of a pedal device for vehicles include a pendant-type pedal device installed by hanging it on a dash panel and an organ-type pedal device installed on a floor panel, according to the mounting structure thereof.

The pendant-type pedal device is operated by allowing a driver to press the lower portion of a pedal pad or push it forward with his/her forefoot because the pedal pad has a center of rotation at the upper portion thereof. The organ-type pedal device is operated by allowing a driver to rotate the upper portion of a pedal pad forwards because the pedal pad has a center of rotation at the lower portion thereof.

The organ-type pedal device may provide an improved sensation of operation since the pedal pad that the driver steps on with his/her foot has a large area and moves similarly to the trajectory of the driver's foot. Accordingly, the organ-type pedal device has an advantage in that the driver can operate it more comfortably than the pendant-type pedal device.

However, the currently used organ-type pedal device cannot easily be adjusted to respond to the different pedal efforts, strokes, and hysteresis operating forces required for individual vehicle models. For this reason, the organ-type pedal device has a disadvantage in that it requires excessive investment costs because the entire pedal device has to be newly designed and manufactured whenever necessary.

The foregoing is intended merely to aid in understanding of the background of the present disclosure, and is not intended to mean that the present disclosure falls within the purview of the related art that is already known to those skilled in the art.

SUMMARY OF THE DISCLOSURE

Therefore, the present disclosure has been made in view of the above problems, and according to various embodiments of the present disclosure, an organ-type electronic pedal device may include a high-load spring module and a hysteresis lever and enables different pedal efforts, strokes, and hysteresis operating forces to be tuned as required for individual vehicle models by changing parts of the hysteresis lever, thereby achieving a reduction in costs. In addition, it is possible to achieve a reduction in package and a reduction in costs through this simplified configuration.

In accordance with various embodiments of the present disclosure, the organ-type electronic pedal device may include a pedal housing, a pedal pad coupled to the pedal housing so as to be rotatable about a hinge pin, the pedal pad being operated by a driver, a hysteresis lever located in the pedal housing while being rotatable relative to the pedal housing, the hysteresis lever being in contact with the pedal pad and configured to generate hysteresis when the pedal pad rotates, and a spring module having two ends supported by the pedal pad and the hysteresis lever.

The organ-type electronic pedal device may further include a plurality of stroke sensors, which are fixed in the pedal housing, connected to the pedal pad, and configured to generate a pedal function-related signal when the pedal pad rotates.

The pedal pad may include a box-shaped pad part having a pad surface operated by a driver's foot, one end of the spring module being inserted into the pad part to be rotatably coupled thereto, and a pedal arm part having one end connected to the pad part and another end coupled to the hinge pin, the pedal arm part being connected to the plurality of stroke sensors.

The pad part and the pedal arm part may be connected to each other to form an L shape.

The pedal arm part may include a sensor pin located above the hinge pin, and the sensor pin may be coupled to a sensor lever of each of the plurality of stroke sensors.

The pad part may be inserted into or protrudes from the pedal housing according to a rotation of the pedal pad by passing through a housing hole included in the pedal housing, and the pedal arm part may be always located in the pedal housing, regardless of the rotation of the pedal pad.

The hysteresis lever may include a plate part installed to support a lower end of the spring module, a lever part bent and extending from one end of the plate part, the lever part being installed to be rotatable about a lever shaft relative to the pedal housing, and a friction part protruding from an end of the lever part, the friction part being in contact with an upper surface of the pad part.

The plate part and the lever part may be connected to each other to form an L shape.

When the two ends of the spring module are supported by the pad part and the plate part, the friction part of the hysteresis lever may be constantly kept in contact with the pad part by spring force of the spring module.

The lower end of the spring module may have a convex round and the plate part may have a rounded groove matching the convex round in shape. The convex round may be inserted into the rounded groove so that the spring module is rotatable when the pedal pad is operated, thereby preventing decoupling of the spring module.

The upper surface of the pad part in contact with the friction part of the hysteresis lever may be in the form of a circular arc along a radius of rotation of the pedal pad around the hinge pin. When the pedal pad rotates, the upper surface of the pad part may be constantly kept in contact with the friction part of the hysteresis lever.

The spring module may have increased spring force when the pad part is inserted into the pedal housing, a force with which the friction part presses the pad part may increase due to a rotation of the hysteresis lever by the spring force, resulting in increased frictional force, and hysteresis may be realized when the pedal pad is operated by the increased frictional force.

The pedal housing may include a stopper part beneath the plate part, and the plate part and the stopper part may be spaced apart from each other.

When the pedal pad normally rotates, the plate part and the stopper part may be constantly kept apart from each other, regardless of the rotation of the hysteresis lever.

When the pedal pad rotates in a state in which the spring force of the spring module is abnormally and excessively increased or in a state in which the hysteresis lever is abnormally and excessively deformed in shape, the plate part may come into contact with the stopper part, thereby preventing the hysteresis lever from rotating excessively.

The organ-type electronic pedal device may be usable either as an accelerator pedal device or as a brake pedal device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
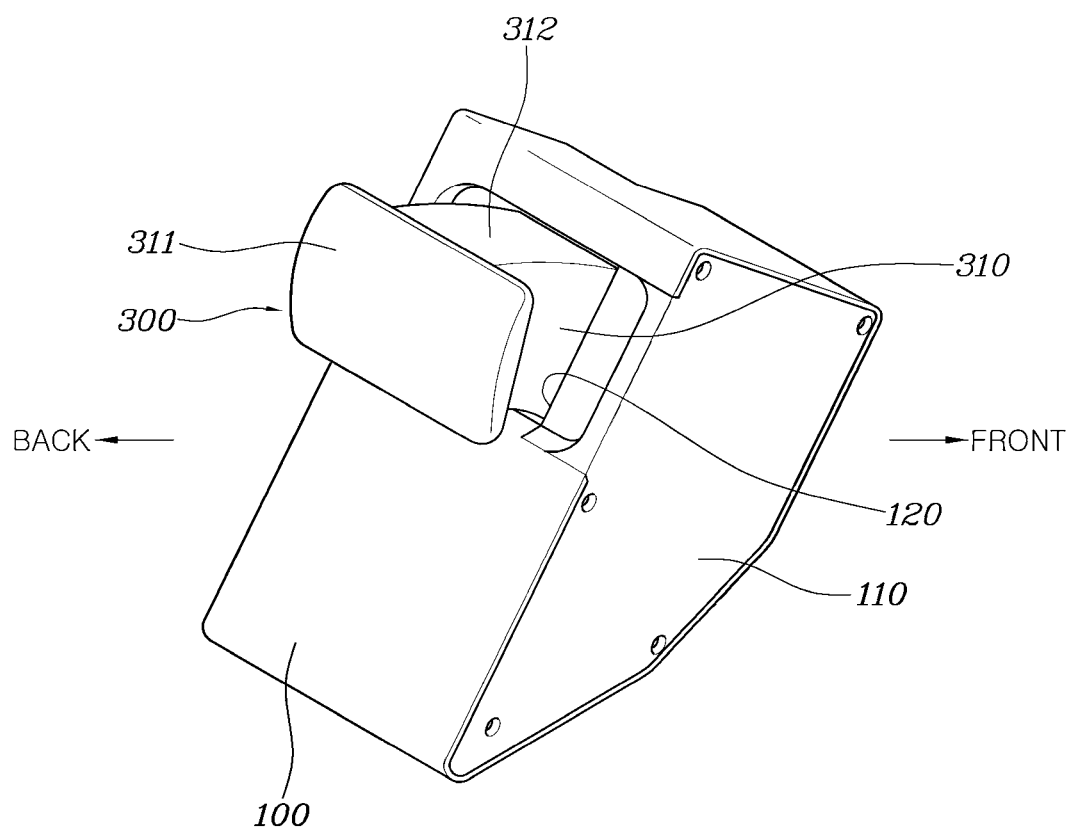
FIG. 1 is a view illustrating an organ-type electronic pedal device according to an exemplary embodiment of the present disclosure.

The specific structural and functional descriptions disclosed in the specification or application are merely illustrated for the purpose of describing embodiments of the present disclosure. The present disclosure may be embodied in different forms, and should not be construed as being limited to the embodiments set forth herein.

The present disclosure may be subjected to various modifications and may have various forms, and specific embodiments will be illustrated in the drawings and described in detail herein. However, this is not intended to limit the present disclosure to a specific embodiment. It should be understood that the present disclosure includes all modifications, equivalents or replacements that fall within the spirit and technical scope thereof.

Terms such as "first" and/or "second" may be used herein to describe various elements of the present disclosure, but these elements should not be construed as being limited by the terms. In other words, such terms will be used only for the purpose of differentiating one element from other elements of the present disclosure. For example, without departing from the scope and spirit of the present disclosure, a first element may be referred to as a second element, and, similarly, a second element may also be referred to as a first element.

It will be understood that when an element is referred to as being "coupled" or "connected" to another element, it can be directly coupled or connected to the other element, or intervening elements may also be present. On the other hand, it will be understood that when an element is referred to as being "directly coupled" or "directly connected" to another element, no intervening elements are present. Other expressions for describing relationships between elements, for example, "between" and "immediately between" or "neighboring" and "directly neighboring", may also be interpreted likewise.

The terminology used herein is for the purpose of describing particular embodiments only, and is not intended to limit the present disclosure. As used herein, the singular forms "a", "an" and "the" are intended to include the plural forms as well, unless context clearly indicates otherwise. It will be further understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms used herein, including technical and scientific terms, have the same meanings as those commonly understood by one of ordinary skill in the art. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

The control unit (controller) according to the exemplary embodiment of the present disclosure may be implemented through a processor (not shown) configured to perform the operation described below using an algorithm configured to control the operation of various components of the vehicle or a nonvolatile memory (not shown) configured to store data relating to software instructions for reproducing the algorithm and data stored in that memory. Here, the memory and the processor may be implemented as separate chips. Alternatively, the memory and the processor may be integrated with each other and implemented as a single chip. The processor may take the form of one or more processors.

Hereinafter, an organ-type electronic pedal device according to an exemplary embodiment of the present disclosure will be described with reference to the accompanying drawings.

As illustrated in FIGS. 1 to 7, the organ-type electronic pedal device according to the exemplary embodiment of the present disclosure includes a pedal housing 100 fixedly installed in a space beneath a driver's seat, a pedal pad 300 coupled to the pedal housing 100 so as to be rotatable back and forth about a hinge pin 200, the pedal pad 300 being operated by a driver, a hysteresis lever 400 located in the pedal housing 100 while being rotatable relative to the pedal housing 100, the hysteresis lever 400 being in contact with the pedal pad 300 and configured to generate hysteresis when the pedal pad 300 rotates, and a spring module 500 supported at both ends thereof by the pedal pad 300 and the hysteresis lever 400.

The pedal housing 100 is in the form of an empty box, and is equipped therein with the pedal pad 300, the hysteresis lever 400, and the spring module 500 with a high load, as well as stroke sensors and a printed circuit board (PCB), which will be described later, and so on. Covers 110 are detachably coupled to both sides of the pedal housing 100.

The pedal pad 300 includes a box-shaped pad part 310 provided with a pad surface 311 operated by a driver's foot, one end of the spring module 500 being inserted into the pad part 310 to be rotatably coupled thereto, and a pedal arm part 320 having one end connected to the pad part 310 and the other end coupled to the hinge pin 200, the pedal arm part 320 being connected to stroke sensors 600.

The pad part 310 and the pedal arm part 320 are connected to each other to form an L shape when viewed from the side, thereby configuring the organ-type pedal device.

The pad part 310 is inserted into or protrudes from the pedal housing 100 according to the rotation of the pedal pad 300 by passing through a housing hole 120 formed in the pedal housing 100. The pedal arm part 320 is always located in the pedal housing 100, regardless of the rotation of the pedal pad 300.

The pad part 310 has a structure in which it is open only at the front side thereof, into which the spring module 500 is inserted, whereas it is sealed on all other sides thereof to prevent the inflow of foreign substances.

The pedal pad 300 is configured such that the lower end of the pedal arm part 320 is rotatable back and forth about the hinge pin 200 relative to the pedal housing 100. When the pedal arm part 320 is rotated forwards, the pad part 310 spaced upward from the hinge pin 200 is inserted into the pedal housing 100 through the housing hole 120 formed in the pedal housing 100. On the other hand, when the pedal arm part 320 is rotated backwards, the pad part 310 protrudes backwards from the pedal housing 100 toward the driver to be exposed.

The pad part 310 has an upper surface 312 and a lower surface in the form of a circular arc having the same trajectory as the radius of rotation of the pedal pad 300 around the hinge pin 200. Through this configuration, it is possible to maintain a constant gap between the pad part 310 and the housing hole 120 formed in the pedal housing 100, thereby minimizing the inflow of foreign substances.

The pad part 310 is installed through the housing hole 120 formed in the pedal housing 100, so the pad part 310 is inserted into or protrudes from the pedal housing 100 according to the rotation of the pedal pad 300. The pedal arm part 320 is always located in the pedal housing 100, regardless of the rotation of the pedal pad 300, so as to avoid contact with the driver.

Accordingly, when the driver operates the pedal pad 300 with his/her foot, the driver may operate only the pad surface 311 of the pad part 310 exposed from the pedal housing 100, and may not operate the pedal arm part 320 located in the pedal housing 100 because the pedal arm part 320 is not in contact with the driver's foot, thereby preventing erroneous operation by the driver.

The spring module 500 is a high-load spring module located obliquely in a direction of movement of the pad part 310 moves. The spring module 500 has an upper end inserted into the pad part 310 of the pedal pad 300 and rotatably coupled to the pad part 310, and a lower end installed to be rotatable while being in contact with the hysteresis lever 400.

A typical pedal device for vehicles requires a high load for safety during operation. To this end, in an exemplary embodiment of the present disclosure, the high-load spring module 500 may be used to implement the required pedal effort.

The high-load spring module 500 may be configured to include two or more springs and two or more dampers, which are usually arranged in series in order to implement the pedal effort.

In an exemplary embodiment of the present disclosure, the electronic pedal device further includes a plurality of stroke sensors 600, which are fixedly installed in the pedal housing 100, connected to the pedal pad 300, and configured to generate a pedal function-related signal when the pedal pad 300 rotates.

Each of the stroke sensors 600 has a sensor lever 610 rotatably coupled thereto. The sensor lever 610 is coupled to a sensor pin 330 provided on the pedal pad 300, and when the pedal pad 300 rotates relative to the pedal housing 100, the sensor lever 610 rotates about the sensor pin 330.

The sensor pins 330 are located above the hinge pin 200 coupled to the pedal arm part 320, and protrude from both sides of the pedal arm part 320.

The sensor pins 330 protrude from both sides of the pedal arm part 320 between the pad part 310 and the hinge pin 200.

As the sensor pins 330 are provided on the pedal arm part 320, the stroke sensors 600 may be positioned so as to be brought closer to the pedal arm part 320, thereby reducing the overall size of the device.

The stroke sensors 600 serve to detect whether the pedal pad 300 returns to its initial position after the pedal pad 300 rotates, and to detect the rotation of the pedal pad 300 when the driver steps on the pedal pad 300.

Each of the stroke sensors 600 includes a permanent magnet and a PCB facing the permanent magnet. Accordingly, when the pedal pad 300 is rotated by the operation of the driver, the stroke sensor 600 detects an angle of rotation of the pedal pad 300 through a change in magnetic field strength in response to a change in position of the permanent magnet to generate a pedal function-related signal.

The stroke sensor 600 may be either an accelerator position sensor (APS) that generates an acceleration-related signal, or a brake position sensor (BPS) that generates a braking-related signal.

Therefore, the electronic pedal device according to the present disclosure may be used either as an accelerator pedal device or as a brake pedal device, or may be used as both of them.

The stroke sensor 600 according to an exemplary embodiment of the present disclosure is a mechanical contact sensor connected to the pedal pad 300 through the sensor lever 610, but it may also be a non-contact sensor composed of only a permanent magnet and a PCB if necessary.

Figure 2:
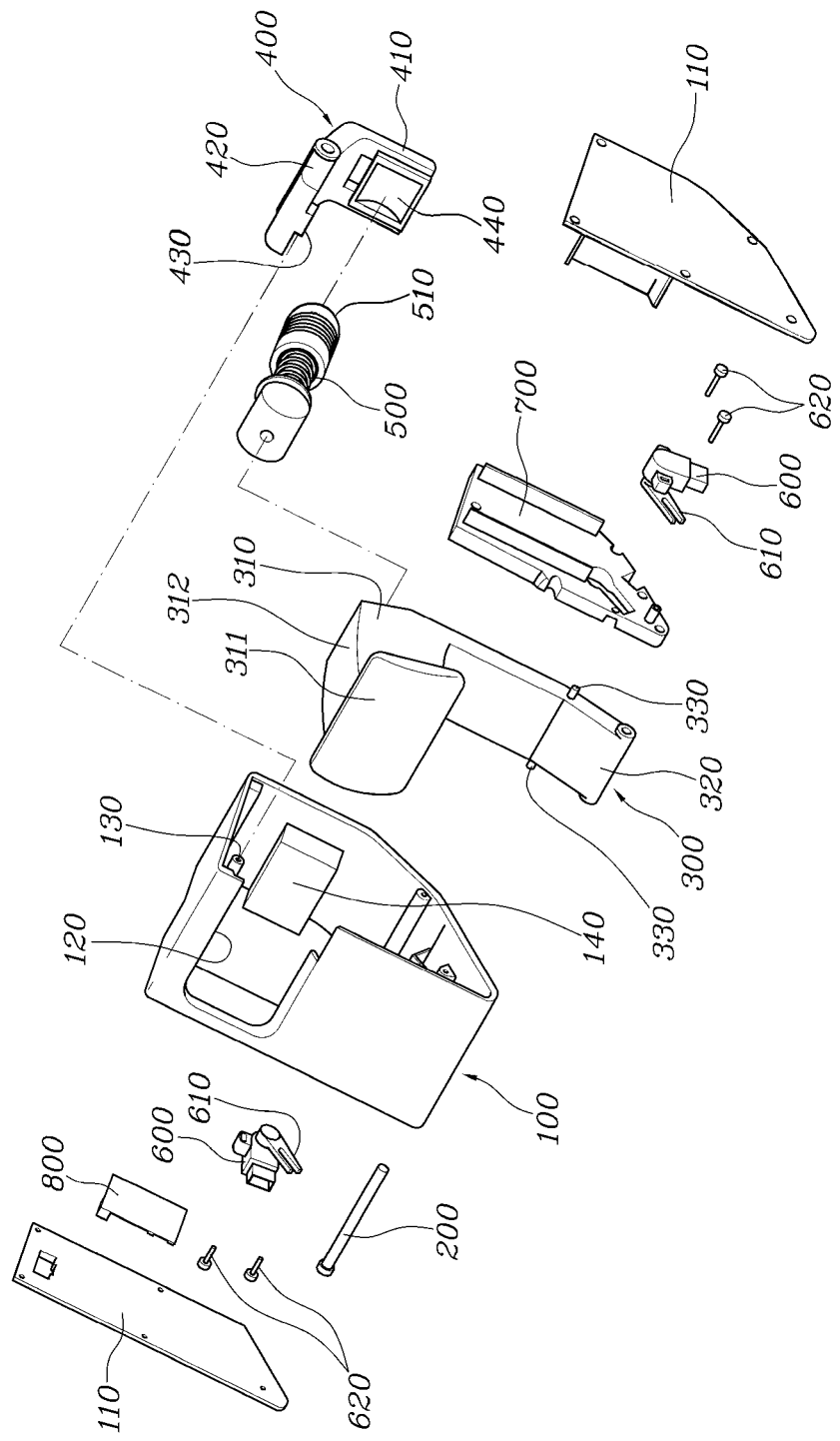
FIG. 2 is an exploded view of FIG. 1.
Figure 3:
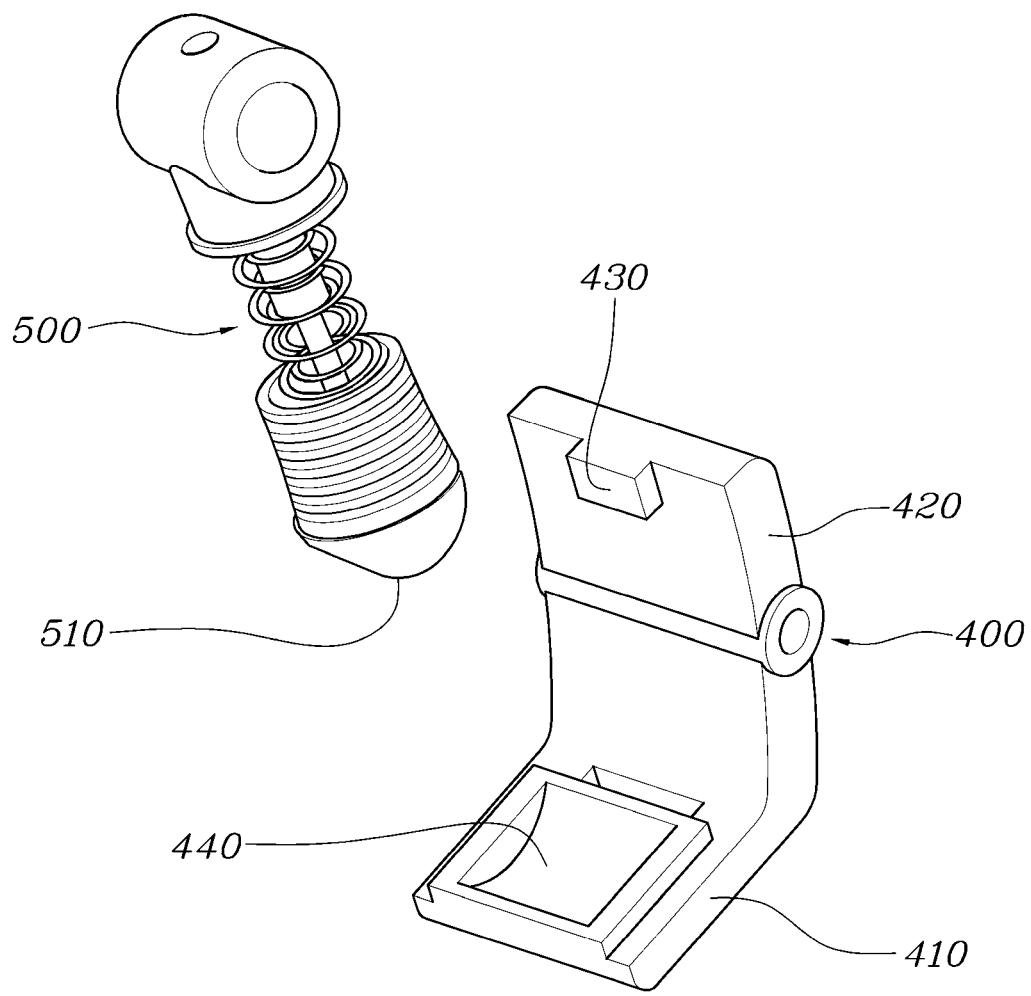
FIG. 3 is an exploded view illustrating a spring module and a hysteresis lever according to an exemplary embodiment of the present disclosure.
Figure 4:
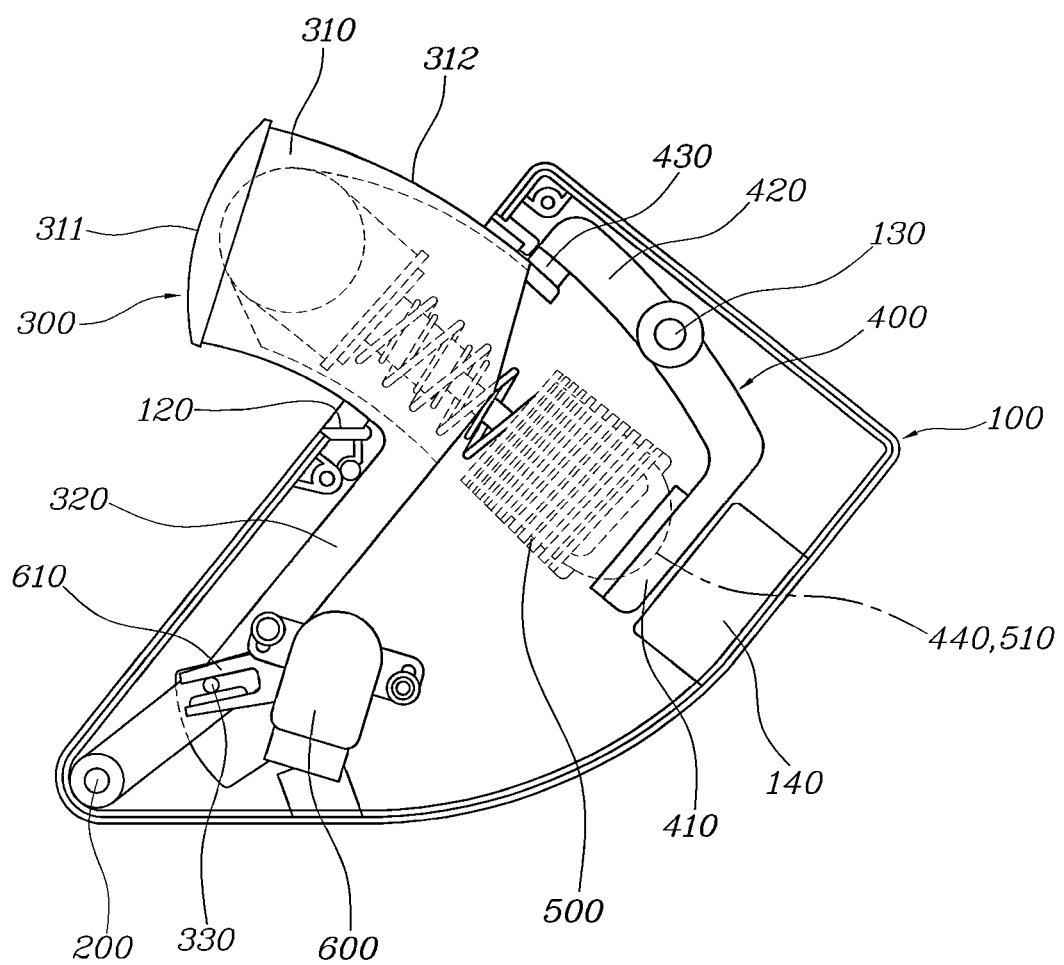
FIG. 4 is a side view illustrating an internal structure of the pedal device according to an exemplary embodiment of the present disclosure, and illustrates a state before a pedal pad is operated.
Figure 5:
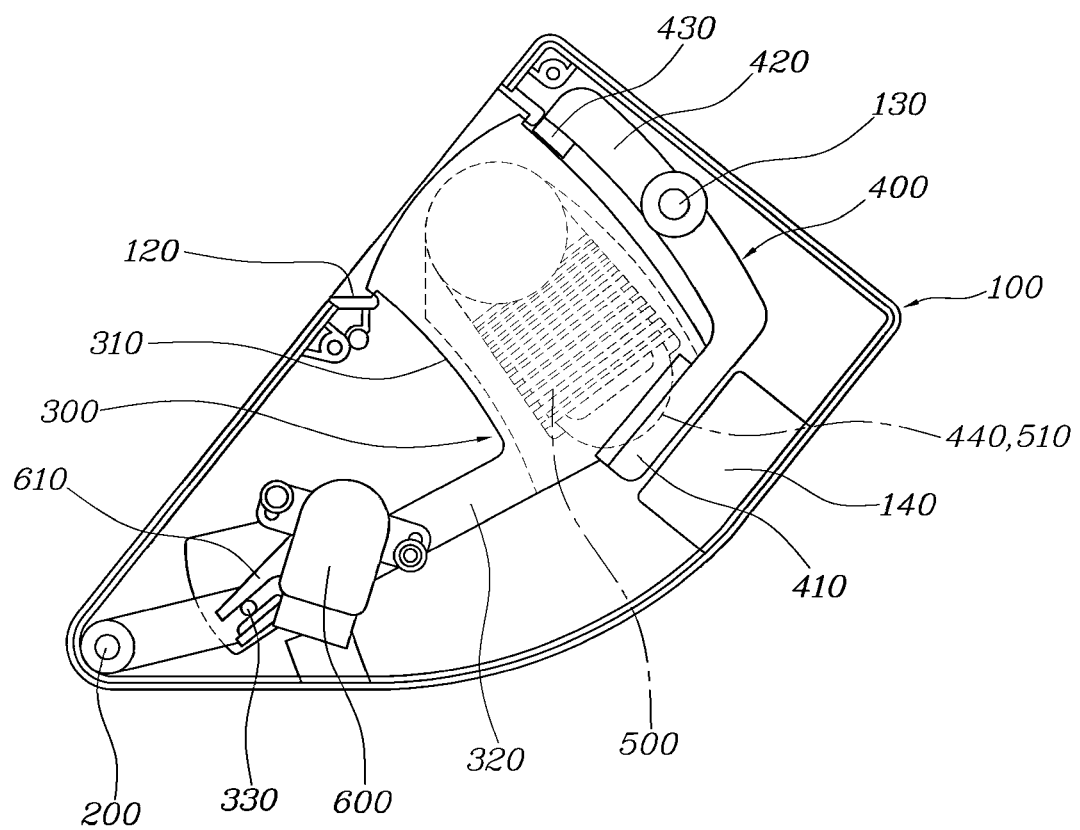
FIG. 5 is a view illustrating a state in which a pad part is inserted into a pedal housing by operating the pedal pad in FIG. 4.
Figure 6:
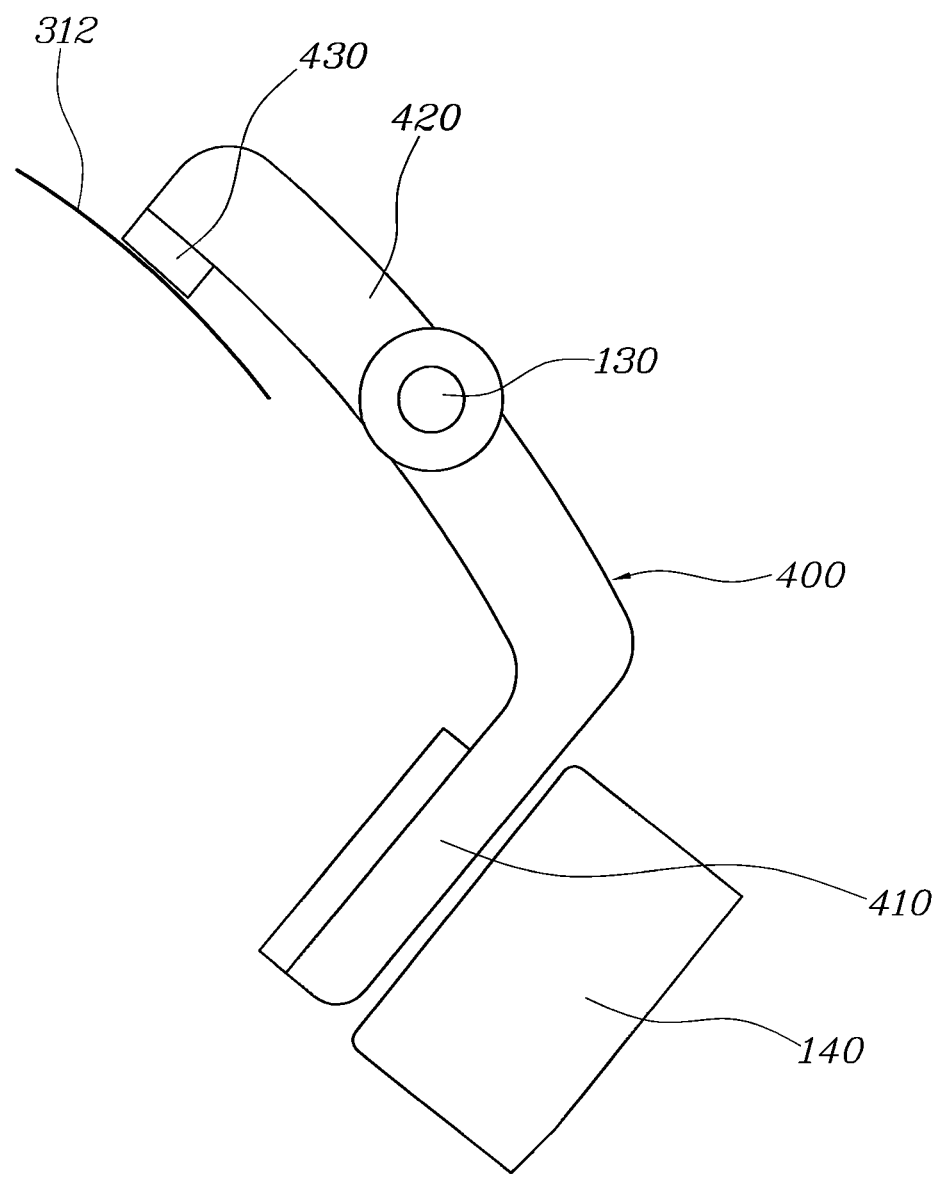
FIG. 6 is a view of a normal state in which a plate part of the hysteresis lever is spaced apart from a stopper part of the pedal housing.
Figure 7:
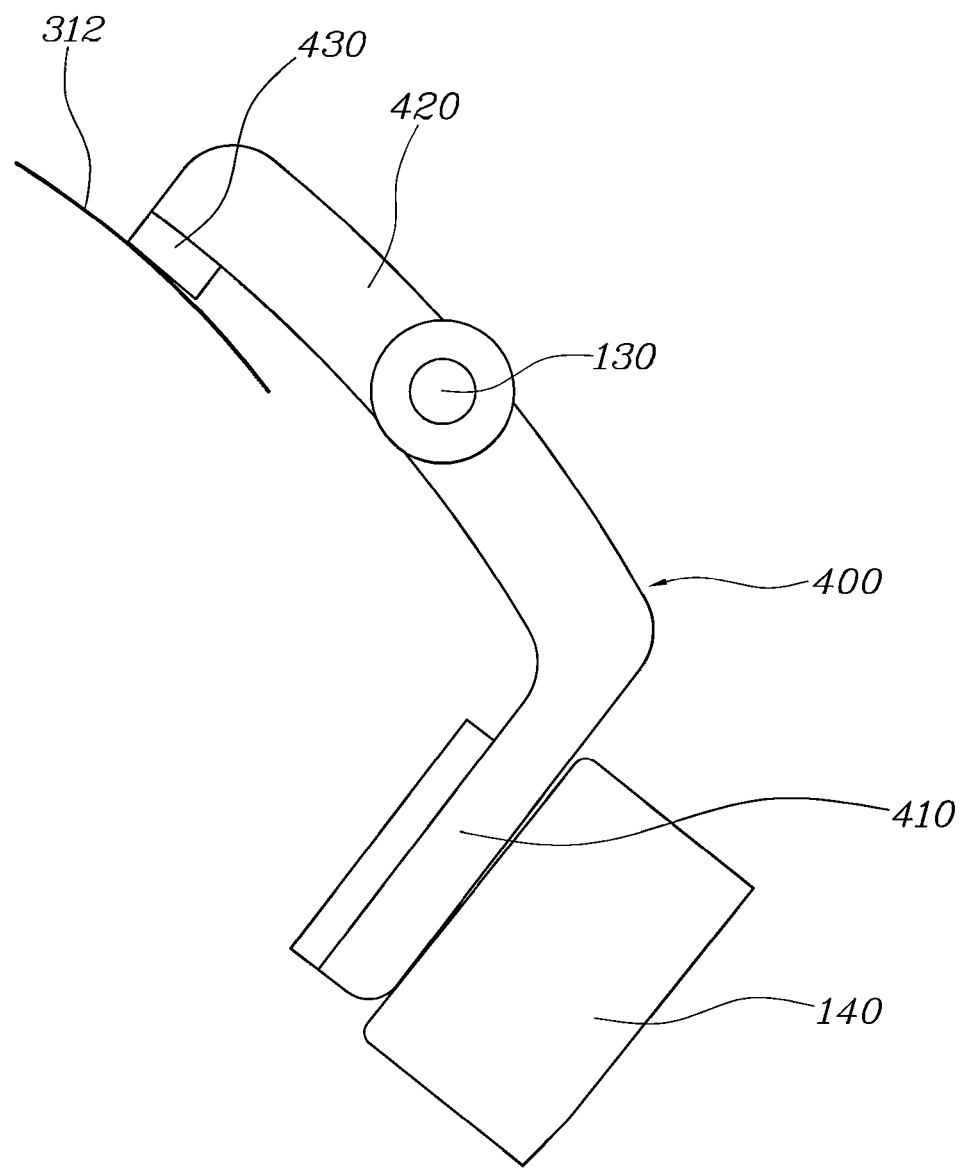
FIG. 7 is a view for explaining a state in which the plate part of the hysteresis lever is in contact with the stopper part of the pedal housing.

Reference numeral 620 in FIG. 2 denotes a coupling member for coupling the stroke sensor 600, and the coupling member may be a bolt or a screw.

The hysteresis lever 400 according to an exemplary embodiment of the present disclosure includes a plate part 410 installed to support the lower end of the spring module 500, a lever part 420 bent and extending from one end of the plate part 410 and installed to be rotatable about a lever shaft 130 relative to the pedal housing 100, and a friction part 430 provided to protrude from the end of the lever part 420 and in contact with the upper surface 312 of the pad part 310.

The lever shaft 130 may be formed integrally with the pedal housing 100, or may be formed separately from the pedal housing 100 and then fixedly coupled to the pedal housing 100.

The lever shaft 130 passes through the lever part 420 of the hysteresis lever 400, so the hysteresis lever 400 is installed to rotate about the lever shaft 130.

The plate part 410 and the lever part 420 are connected to each other to form an L shape when viewed from the side, which enables hysteresis to be realized when the pedal pad 300 rotates.

When both ends (the upper and lower ends) of the spring module 500 are supported by the pad part 310 of the pedal pad 300 and the plate part 410 of the hysteresis lever 400 in the present disclosure, the friction part 430 of the hysteresis lever 400 is constantly kept in contact with the upper surface 312 of the pad part 310 by the spring force of the spring module 500, which enables hysteresis to be realized when the pedal pad 300 rotates. In particular, it is possible to generate an initial operating force of the pedal pad 300 using the spring force of the spring module 500.

In the present disclosure, the lower end of the spring module 500 is a round 510 formed to protrude convexly, and the plate part 410 of the hysteresis lever 400 has a rounded groove 440 matching the round 510 in shape.

Accordingly, when the lower end of the spring module 500 is supported by the plate part 410 of the hysteresis lever 400, the round 510 of the spring module 500 is inserted into the rounded groove 440 in the plate part 410. Through this configuration, when the pedal pad 300 is operated, it is possible to rotate the spring module 500, and in particular to prevent decoupling of the spring module 500.

In the present disclosure, the upper surface 312 of the pad part 310 in contact with the friction part 430 of the hysteresis lever 400 is in the form of a circular arc along the radius of rotation of the pedal pad 300 around the hinge pin 200. Thus, when the pedal pad 300 rotates, the upper surface 312 of the pad part 310 may be constantly kept in contact with the friction part 430 of the hysteresis lever 400.

Since the upper surface 312 and the lower surface of the pad part 310 are in the form of a circular arc having the same trajectory as the radius of rotation of the pedal pad 300 around the hinge pin 200, it is possible to maintain a constant gap between the pad part 310 and the housing hole 120 formed in the pedal housing 100, thereby minimizing the inflow of foreign substances.

When the pedal pad 300 rotates, a hysteresis operating force is formed by the contact between the friction part 430 of the hysteresis lever 400 and the upper surface 312 of the pad part 310. In this case, during the operation of the pedal pad 300 except for the spring force of the spring module 500, a hysteresis value reflecting the spring force may be accurately predicted only when the amount of contact between the friction part 430 and the upper surface 312 of the pad part 310 is constant. Therefore, the upper surface 312 of the pad part 310 is preferably in the form of a circular arc having the same trajectory as the radius of rotation of the pedal pad 300 around the hinge pin 200.

In the pedal device according to an exemplary embodiment of the present disclosure, the spring force of the spring module 500 increases when the pad part 310 is inserted into the pedal housing 100 due to operation of the pedal pad 300 by the driver. In addition, due to the rotation of the hysteresis lever 400 by the spring force, the force with which the friction part 430 presses the upper surface 312 of the pad part 310 increases, resulting in increased frictional force. Accordingly, hysteresis is realized when the pedal pad 300 is operated by the increased frictional force.

The pedal device according to an exemplary embodiment of the present disclosure includes a stopper part 140 formed to protrude upwards from the inner bottom of the pedal housing 100. The stopper part 140 is located beneath the plate part 410 of the hysteresis lever 400.

In addition, the plate part 410 and the stopper part 140 are spaced apart from each other for rotation of the hysteresis lever 400 when the driver operates the pedal pad 300.

That is, when the pedal pad 300 normally rotates, the plate part 410 and the stopper part 140 are constantly kept apart from each other, regardless of the rotation of the hysteresis lever 400. As a result, hysteresis can be smoothly realized by the rotation of the hysteresis lever 400 according to the operation of the pedal pad 300 (see FIG. 6).

On the other hand, when the pedal pad 300 rotates in the state in which the spring force of the spring module 500 is abnormally and excessively increased or in the state in which the shape of the hysteresis lever 400 is abnormally and excessively deformed, the plate part 410 comes into contact with the stopper part 140. Therefore, it is possible to prevent the hysteresis lever 400 from rotating excessively (see FIG. 7). In one exemplary embodiment, the spring force of the spring module 500 being abnormally and excessively increased may mean that the spring force is increased to an amount higher than a predetermined amount, but is not limited thereto. In one exemplary embodiment, the shape of the hysteresis lever 400 being abnormally and excessively deformed may mean that the shape of the hysteresis lever 400 is deformed in a degree larger than a predetermined amount, but is not limited thereto.

If the hysteresis lever 400 rotates excessively due to absence of the stopper part 140 when the pedal pad 300 is operated, the contact force between the friction part 430 and the upper surface 312 of the pad part 310 is excessively large, thereby generating more frictional force than necessary. In this case, since the return of the hysteresis lever 400 and the return of the pedal pad 300 are delayed, there is a high possibility that the pedal device may not operate smoothly.

Reference numeral 700 in FIG. 2 denotes an inner bracket located in the pedal housing 100, and the stroke sensor 600 may be fixedly installed to the inner bracket. In addition, reference number 800 denotes a PCB fixedly installed in the pedal housing 100, and the PCB serves to perform fault diagnosis and CAN communication with pedal-related parts.

As described above, the organ-type pedal device according to the present disclosure includes the high-load spring module 500 and the hysteresis lever 400. If necessary, the organ-type pedal device enables different pedal efforts, strokes, and hysteresis operating forces to be tuned as required for individual vehicle models by changing the parts of the hysteresis lever 400, thereby achieving a reduction in costs. In addition, it is possible to achieve a reduction in package and a reduction in costs through this simplified configuration, and to minimize driver's ankle fatigue.

As is apparent from the above description, the organ-type electronic pedal device according to the present disclosure includes the high-load spring module and the hysteresis lever. If necessary, the organ-type pedal device enables different pedal efforts, strokes, and hysteresis operating forces to be tuned as required for individual vehicle models by changing the parts of the hysteresis lever, thereby achieving a reduction in costs. In addition, it is possible to achieve a reduction in package and a reduction in costs through this simplified configuration, and to minimize driver's ankle fatigue.

Although specific embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:
1. An organ-type electronic pedal device comprising:
a pedal housing;

a pedal pad coupled to the pedal housing so as to be rotatable about a hinge pin, the pedal pad being operated by a driver;

a hysteresis lever located in the pedal housing and rotatable relative to the pedal housing, the hysteresis lever being in contact with the pedal pad and configured to generate hysteresis when the pedal pad rotates;

a spring module having two ends supported by the pedal pad and the hysteresis lever; and a plurality of stroke sensors, which are fixed in the pedal housing, connected to the pedal pad, and configured to generate a pedal function-related signal when the pedal pad rotates, the pedal pad comprises:

a box-shaped pad part having a pad surface operated by a driver's foot, one end of the spring module being inserted into the pad part to be rotatably coupled thereto; and a pedal arm part having one end connected to the pad part and another end coupled to the hinge pin, the pedal arm part being connected to the plurality of stroke sensors.

2. The organ-type electronic pedal device according to claim 1, wherein the pad part and the pedal arm part are connected to each other to form an L shape.

3. The organ-type electronic pedal device according to claim 1, wherein:

the pedal arm part includes a sensor pin located above the hinge pin, and the sensor pin is coupled to a sensor lever of each of the plurality of stroke sensors.

4. The organ-type electronic pedal device according to claim 1, wherein:

the pad part is inserted into or protrudes from the pedal housing according to a rotation of the pedal pad by passing through a housing hole included in the pedal housing, and the pedal arm part is located in the pedal housing, regardless of the rotation of the pedal pad.

5. The organ-type electronic pedal device according to claim 1, wherein the hysteresis lever comprises:

a plate part installed to support a lower end of the spring module;

a lever part bent and extending from one end of the plate part, the lever part being installed to be rotatable about a lever shaft relative to the pedal housing; and a friction part protruding from an end of the lever part, the friction part being in contact with an upper surface of the pad part.

6. The organ-type electronic pedal device according to claim 5, wherein the plate part and the lever part are connected to each other to form an L shape.

7. The organ-type electronic pedal device according to claim 5, wherein when the two ends of the spring module are supported by the pad part and the plate part, the friction part of the hysteresis lever is constantly kept in contact with the pad part by spring force of the spring module.

8. The organ-type electronic pedal device according to claim 5, wherein:

the lower end of the spring module has a convex round, the plate part has a rounded groove matching the convex round in shape, and the convex round is inserted into the rounded groove so that the spring module is rotatable when the pedal pad is operated, thereby preventing decoupling of the spring module.

9. The organ-type electronic pedal device according to claim 5, wherein:

the upper surface of the pad part in contact with the friction part of the hysteresis lever is in the form of a circular arc along a radius of rotation of the pedal pad around the hinge pin, and when the pedal pad rotates, the upper surface of the pad part is constantly kept in contact with the friction part of the hysteresis lever.

10. The organ-type electronic pedal device according to claim 5, wherein the spring module has increased spring force when the pad part is inserted into the pedal housing, a force with which the friction part presses the pad part increases due to a rotation of the hysteresis lever by the spring force, resulting in increased frictional force, and hysteresis is realized when the pedal pad is operated by the increased frictional force.

11. The organ-type electronic pedal device according to claim 5, wherein:

the pedal housing includes a stopper part beneath the plate part, and the plate part and the stopper part are spaced apart from each other.

12. The organ-type electronic pedal device according to claim 10, wherein when the pedal pad normally rotates, the plate part and the stopper part are constantly kept apart from each other, regardless of the rotation of the hysteresis lever.

13. The organ-type electronic pedal device according to claim 10, wherein when the pedal pad rotates in a state in which the spring force of the spring module is excessively increased or in a state in which the hysteresis lever is excessively deformed in shape, the plate part comes into contact with the stopper part, thereby preventing the hysteresis lever from rotating excessively.

14. The organ-type electronic pedal device according to claim 1, wherein the organ-type electronic pedal device is usable either as an accelerator pedal device or as a brake pedal device.

* * * * *